US012579987B2

(12) United States Patent
Sehlstedt et al.

(10) Patent No.: US 12,579,987 B2
(45) Date of Patent: Mar. 17, 2026

(54) METHODS FOR FREQUENCY DOMAIN PACKET LOSS CONCEALMENT AND RELATED DECODER

(71) Applicant: Telefonaktiebolaget LM Ericsson (publ), Stockholm (SE)

(72) Inventors: Martin Sehlstedt, Luleå (SE); Jonas Svedberg, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 147 days.

(21) Appl. No.: 17/432,681

(22) PCT Filed: Feb. 20, 2020

(86) PCT No.: PCT/EP2020/054522
§ 371 (c)(1),
(2) Date: Aug. 20, 2021

(87) PCT Pub. No.: WO2020/169756
PCT Pub. Date: Aug. 27, 2020

(65) Prior Publication Data
US 2022/0172733 A1 Jun. 2, 2022

Related U.S. Application Data

(60) Provisional application No. 62/808,587, filed on Feb. 21, 2019, provisional application No. 62/808,610, (Continued)

(51) Int. Cl.
*G10L 19/005* (2013.01)
*G06F 17/14* (2006.01)
(Continued)

(52) U.S. Cl.
CPC .......... *G10L 19/005* (2013.01); *G06F 17/142* (2013.01); *G10L 19/02* (2013.01);
(Continued)

(58) Field of Classification Search
CPC ... G10L 19/0017; G10L 19/02; G10L 19/022; G10L 19/025; G10L 25/45; G10L 19/005
(Continued)

(56) References Cited

U.S. PATENT DOCUMENTS 5,848,391 A * 12/1998 Bosi ...................... G10L 19/022
704/200.1
5,884,253 A * 3/1999 Kleijn ................... G10L 19/097
704/265
(Continued)

FOREIGN PATENT DOCUMENTS

AU 2012201692 A1 4/2012
CN 101025918 A 8/2007
(Continued)

OTHER PUBLICATIONS

ITU-T G.711 Appendix I: a high quality low-complexity algorithm for packet loss concealment with G.711, Sep. 30, 1999, 26 Pages. (Year: 1999).*
(Continued)

*Primary Examiner* — Martin Lerner
(74) *Attorney, Agent, or Firm* — Sage Patent Group

(57) ABSTRACT

A method, decoder, and program code for filling an analysis window length with a time domain signal for concealing a lost audio frame associated with a received audio signal. A first segment of a previously received part of a received audio signal is copied from a prototype buffer. A second segment of the previously received part of the received audio signal is overlap added from the prototype buffer to an initial portion of a reconstructed part of the received audio signal followed by a remaining portion of the reconstructed part of the received audio signal.

24 Claims, 10 Drawing Sheets

Related U.S. Application Data filed on Feb. 21, 2019, provisional application No. 62/808,600, filed on Feb. 21, 2019.

(51) Int. Cl.

| | |
|---|---|
| *G10L 19/02* | (2013.01) |
| *G10L 19/022* | (2013.01) |
| *G10L 25/18* | (2013.01) |
| *G10L 25/45* | (2013.01) |
| *H04L 65/75* | (2022.01) |
| *H04L 65/80* | (2022.01) |

(52) U.S. Cl.
CPC ...... *G10L 19/0204* (2013.01); *G10L 19/0212* (2013.01); *G10L 25/18* (2013.01); *G10L 25/45* (2013.01); *H04L 65/75* (2022.05); *H04L 65/80* (2013.01)

(58) Field of Classification Search
USPC ........ 704/203, 205, 211, 500, 501, 206, 208
See application file for complete search history.

(56) References Cited

U.S. PATENT DOCUMENTS

| | | | | |
|---|---|---|---|---|
| 6,597,961 | B1 * | 7/2003 | Cooke | G10L 19/005 |
| 7,016,850 | B1 * | 3/2006 | Cox | G10L 21/04 |
| | | | | 379/88.07 |
| 7,117,156 | B1 * | 10/2006 | Kapilow | G10L 19/0017 |
| | | | | 704/228 |
| 7,324,444 | B1 * | 1/2008 | Liang | H04J 3/0632 |
| | | | | 370/230.1 |
| 7,590,531 | B2 * | 9/2009 | Khalil | G10L 19/005 |
| | | | | 704/226 |
| 8,718,804 | B2 * | 5/2014 | Gao | G10L 19/005 |
| | | | | 714/747 |
| 8,775,193 | B2 | 7/2014 | Schnell et al. | |
| 9,129,600 | B2 * | 9/2015 | Gibbs | G10L 19/20 |
| 9,613,629 | B2 * | 4/2017 | Faure | G10L 19/12 |
| 9,761,230 | B2 * | 9/2017 | Daniel | G10L 19/005 |
| 10,424,305 | B2 * | 9/2019 | Biswas | G10L 19/0212 |
| 2003/0035384 | A1 * | 2/2003 | Cline | H04B 3/23 |
| | | | | 379/226 |
| 2005/0166124 | A1 * | 7/2005 | Tsuchinaga | G10L 19/005 |
| | | | | 714/776 |
| 2006/0182086 | A1 * | 8/2006 | Dowdal | H04L 65/80 |
| | | | | 370/352 |
| 2006/0277052 | A1 * | 12/2006 | He | G10L 21/04 |
| | | | | 704/503 |
| 2009/0037168 | A1 * | 2/2009 | Gao | G10L 19/005 |
| | | | | 704/219 |
| 2009/0119098 | A1 * | 5/2009 | Zhan | G10L 19/005 |
| | | | | 704/219 |
| 2010/0305953 | A1 * | 12/2010 | Susan | G10L 19/005 |
| | | | | 704/E19.023 |
| 2010/0312553 | A1 * | 12/2010 | Fang | G10L 19/005 |
| | | | | 704/226 |
| 2011/0022924 | A1 * | 1/2011 | Malenovsky | G10L 19/005 |
| | | | | 714/752 |
| 2011/0099008 | A1 * | 4/2011 | Zopf | G10L 19/005 |
| | | | | 704/219 |
| 2011/0196673 | A1 * | 8/2011 | Sharma | G10L 19/005 |
| | | | | 704/207 |
| 2014/0119478 | A1 * | 5/2014 | Fazeldehkordi | G10L 19/005 |
| | | | | 375/341 |
| 2015/0255079 | A1 * | 9/2015 | Huang | G10L 19/0017 |
| | | | | 704/500 |
| 2016/0104490 | A1 | 4/2016 | Sukowski et al. | |
| 2016/0148618 | A1 | 5/2016 | Huang et al. | |
| 2016/0365097 | A1 * | 12/2016 | Guan | G10L 19/005 |
| 2017/0103760 | A1 * | 4/2017 | Näslund | G10L 19/005 |
| 2017/0213561 | A1 * | 7/2017 | Faure | G10L 19/022 |
| 2017/0256266 | A1 | 9/2017 | Sung et al. | |
| 2018/0315435 | A1 * | 11/2018 | Goodwin | G10L 19/022 |
| 2019/0251978 | A1 * | 8/2019 | Ekstrand | G10L 19/008 |

FOREIGN PATENT DOCUMENTS

| | | | | |
|---|---|---|---|---|
| CN | 101939781 | A | 1/2011 | |
| CN | 102893330 | A | 1/2013 | |
| CN | 104995675 | A | 10/2015 | |
| EP | 3176781 | A2 | 6/2017 | |
| JP | 2016-511433 | A | 4/2016 | |
| JP | 2016510432 | A | 4/2016 | |
| JP | 2016-528535 | A | 9/2016 | |
| JP | 2017-521728 | A | 8/2017 | |
| WO | 2011063694 | A1 | 6/2011 | |
| WO | 2014123470 | A1 | 8/2014 | |
| WO | 2014123471 | A1 | 8/2014 | |
| WO | 2015003027 | A1 | 1/2015 | |
| WO | WO-2020169757 | A1 * | 8/2020 | ........... G10L 19/005 |

OTHER PUBLICATIONS

Notice of Reasons for Rejection mailed Nov. 29, 2022 for Japanese Patent Application No. 2021-547688, 6 pages (includes English translation).

International Search Report and Written Opinion of the International Searching Authority for PCT International Application No. PCT/EP2020/054522 dated Jun. 8, 2020.

3GPP TS 26.445 V15.1.0, clause 6.2.4.1, "3rd Generation Partnership Project; Technical Specification Group Services and System Aspects; Codec for Enhanced Voice Services (EVS); Detailed Algorithmic Description (Release 15)," Dec. 2018, 2 pages.

3GPP TS 26.445 V15.1.0, clause 5.3.2.2, "3rd Generation Partnership Project; Technical Specification Group Services and System Aspects; Codec for Enhanced Voice Services (EVS); Detailed Algorithmic Description (Release 15)," Dec. 2018, 5 pages.

3GPP TS 26.447 V15.0.0, clause 5.4.3.5, "3rd Generation Partnership Project; Technical Specification Group Services and System Aspects; Codec for Enhanced Voice Services (EVS); Error Concealment of Lost Packets (Release 15)," Jun. 2018, 5 pages.

Japanese Office Action, Japanese Patent Application No. 2023-107640, mailed Jul. 6, 2023, 3 pages.

Colombian Office Action, Colombian Patent Application No. NC2021/0010587, mailed Jul. 19, 2024, 12 pages.

Chinese Office Action and English Translation, Chinese Application No. 202080015563.1, mailed Dec. 17, 2024, 9 pages.

Chinese Notice of Allowance and English Translation, Chinese Patent Application No. 202080015563.1, mailed Apr. 17, 2025, 16 pages.

* cited by examiner

Analog Input → ADC → Encoder → Network → Decoder → DAC → Analog Output

Decoder including PLC

Bit Stream → Stream Decoder 204

BFI=0

BFI=1

BFI → PLC 202

200

DAC 206 → Analog Output

| $f_s$ sampling frequency Hz | $L_{copy}$ | Time duration of the Copy segment ms |
|---|---|---|
| 8000 | 16 | 2 |
| 16000 | 32 | 2 |
| 24000 | 48 | 2 |
| 32000 | 64 | 2 |
| 44,100, 48000 | 96 | 2.177, 2 |

Figure 8

| $f_s$ Hz | $L_{ola}$ | Time duration of the OLA segment ms |
|---|---|---|
| 8000 | 14 | 1.75 |
| 16000 | 28 | 1.75 |
| 24000 | 42 | 1.75 |
| 32000 | 56 | 1.75 |
| 44,100, 48000 | 84 | 1.905, 1.75 |

Figure 9

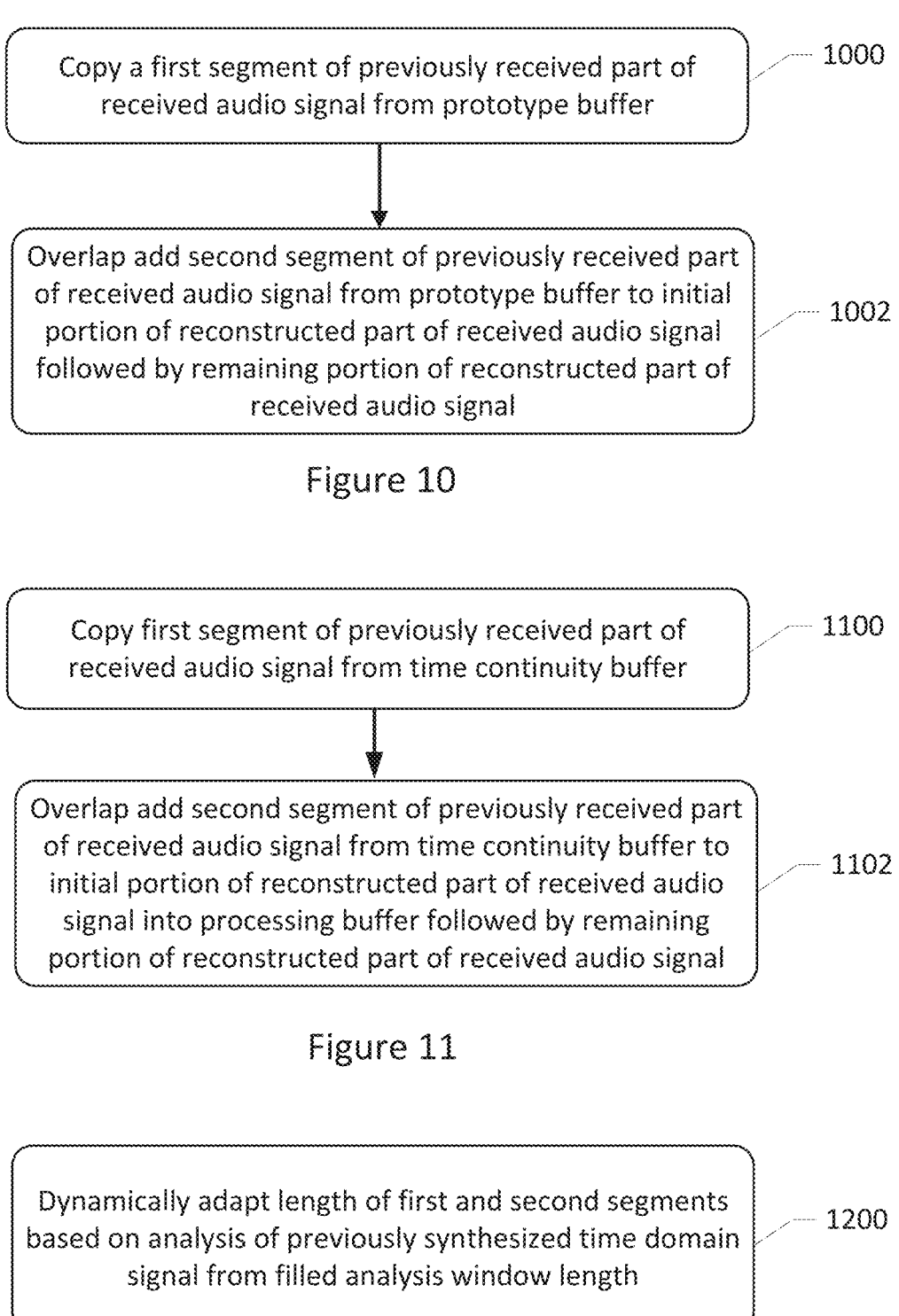

Copy a first segment of previously received part of received audio signal from prototype buffer ⎯ 1000

Overlap add second segment of previously received part of received audio signal from prototype buffer to initial portion of reconstructed part of received audio signal followed by remaining portion of reconstructed part of received audio signal ⎯ 1002

Figure 10

Copy first segment of previously received part of received audio signal from time continuity buffer ⎯ 1100

Overlap add second segment of previously received part of received audio signal from time continuity buffer to initial portion of reconstructed part of received audio signal into processing buffer followed by remaining portion of reconstructed part of received audio signal ⎯ 1102

Figure 11

Dynamically adapt length of first and second segments based on analysis of previously synthesized time domain signal from filled analysis window length ⎯ 1200

Figure 12

METHODS FOR FREQUENCY DOMAIN PACKET LOSS CONCEALMENT AND RELATED DECODER

CROSS REFERENCE TO RELATED APPLICATIONS

This application is a 35 U.S.C. § 371 national stage application of PCT International Application No. PCT/EP2020/054522 filed on Feb. 20, 2020, which claims the benefit of U.S. Provisional Patent Application Ser. No. 62/808,587, filed on Feb. 21, 2019, U.S. Provisional Patent Application Ser. No. 62/808,600, filed on Feb. 21, 2019, and U.S. Provisional Patent Application Ser. No. 62/808,610, filed on Feb. 21, 2019, the disclosures and content of which are incorporated by reference herein in their entireties.

TECHNICAL FIELD

The present disclosure relates generally to a method for filling an analysis window length for concealing a lost audio frame associated with a received audio signal. The present disclosure also relates to a decoder configured to for filling an analysis window length for concealing a lost audio frame associated with a received audio signal.

BACKGROUND

Transmission of speech/audio over modern communications channels/networks is mainly done in the digital domain using a speech/audio codec. This may involve taking the analog signal and digitalizing it using sampling and analog to digital converter (ADC) to obtain digital samples. These digital samples may be further grouped into frames that contain samples from a consecutive period of 10-40 ms depending on the application. These frames may then be processed using a compression algorithm, which reduces the number of bits that needs to be transmitted and which may still achieve as high quality as possible. The encoded bit stream is then transmitted as data packets over the digital network to the receiver. In the receiver, the process is reversed. The data packets may first be decoded to recreate the frame with digital samples which may then be inputted to a digital to analog converter (DAC) to recreate the approximation of the input analog signal at the receiver. FIG. 1 provides an example of a block diagram of an audio transfer using audio encoder and decoder over a network, such as a digital network, using the above-described approach.

When the data packets are transmitted over the network there can be data packets that may either be dropped by the network due to traffic load or dropped as a result of bit errors making the digital data invalid for decoding. When these events happen, the decoder needs to replace the output signal during periods where it is impossible to do the actual decoding. This replacement process is typically called frame/packet loss concealment (PLC). FIG. 2 illustrates a block diagram of a decoder 200 including packet loss concealment. When a Bad Frame Indicator (BFI) indicates lost or corrupted frame, PLC 202 may create a signal to replace the lost/corrupted frame. Otherwise, i.e. when BFI does not indicate lost or corrupted frame, the received signal is decoded by a stream decoder 204. A frame erasure may be signalled to the decoder by setting the bad frame indicator variable for the current frame active, i.e. BFI=1. The decoded or concealed frame is then input to DAC 206 to output an analog signal. Frame/packet loss concealment may also be referred to as error concealment unit (ECU).

There are numerous ways of doing packet loss concealment in a decoder. Some examples are replacing the lost frame with silence and repeating the last frame (or decoding of the last frame parameters). Other approaches try to replace the frame with the most likely continuation of the audio signal. For noise like signals, one approach may generate noise with a similar spectral structure. For tonal signals, one may first estimate the characteristics of present tones (frequency, amplitude, and phase) and use these parameters to generate a continuation of the tones at the corresponding temporal locations of lost frames.

Another approach for an ECU is the Phase ECU, originally described in international patent application no. WO2014123470 and later in 3GPP TS 26.447 V15.0.0 clause 5.4.3.5, where the decoder may continuously save a prototype of the decoded signal during normal decoding. This prototype may be used in case of a lost frame. The prototype is spectrally analyzed, and the noise and tonal ECU functions are combined in the spectral domain. The Phase ECU identifies tones in the spectrum and calculates a spectral temporal replacement of related spectral bins. The other bins (non-tonal) may be handled as noise and are scrambled to avoid tonal artifacts in these spectral regions. The resulting recreated spectrum is inverse FFT (fast Fourier transform) (IFFT) transformed into time domain and the signal is processed to create a replacement of the lost frame. When the audio codec is based on modified discrete cosine transform (MDCT), the creation of the replacement includes the windowing, TDA (Time Domain aliasing) and ITDA (Inverse TDA) related to lapped MDCT to create an integrated continuation of the already decoded signal. This method may ensure continued use of MDCT memory and creation of MDCT memory that is to be used of the first good frame.

SUMMARY

With a PLC using sinusoidal modeling in the frequency domain, the recreated signal may be less reliable at the endpoints of the IFFT signal. Part of this may be masked by the windows shape of the MDCT analysis window, especially when it is symmetric regarding leading and trailing zeros. Leading zeros are positioned on future samples and therefore lowers the algorithmic delay of the coder and therefore may be frequently used. Trailing zeros may be mainly used to make the windows simpler but this may lower the transform efficiency as they contribute to the complexity without adding any information on the input signal. It therefore may be common to use fewer trailing zeros. Low delay asymmetric MDCT windows may have sharper (quickly increasing/quickly decreasing) window shapes than larger delay symmetric MDCT windows with a similar frequency resolution. The sharper windows shapes in combination with the lower reliability of the IFFT signal may include more of these unreliable parts into the MDCT analysis windowing, and the subsequent TDA and ITDA steps, used to create the final reconstructed signal including an updated MDCT memory (a.k.a. MDCT OLA (overlap add) memory buffer). This may result in lower quality of the reconstructed signal. While one approach may be to increase the length of the prototype, this may not be desirable as this may significantly increase the complexity of the PLC. Another approach may be to use a shorter MDCT window within the actual audio codec, but that may lead to worse frequency resolution (and worse performance) for the audio codec.

The combination of a rather short Inverse Fast Fourier Transform (IFFT) (e.g. of a length corresponding to 16 ms, providing roughly 12 ms of reliable evolved samples in the time domain) and a Low delay MDCT analysis and synthesis steps using "Windowing→TDA→ITDA" input that is considerably larger (e.g. 18 ms) than the provided 12 ms of time domain samples is a challenging problem to solve. Using a larger IFFT increases complexity (e.g., of the PLC) and using a smaller low-delay MDCT (LD-MDCT) window decreases the codec's spectral resolution, which in turn will deteriorate the compression efficiency.

According to some embodiments of inventive concepts, methods are provided to operate a decoder for filling an analysis window length with a time domain signal for concealing a lost audio frame associated with a received audio signal. In such methods, a first segment of a previously received part of a received audio signal is copied from a prototype buffer. A second segment of the previously received part of the received audio signal from the prototype buffer is overlap added to an initial portion of a reconstructed part of the received audio signal followed by a remaining portion of the reconstructed part of the received audio signal.

According to further embodiments of inventive concepts, a decoder for filling an analysis window length with a time domain signal for concealing a lost audio frame associated with a received audio signal is provided. The decoder includes a processor and memory coupled with the processor, wherein the memory includes instructions that when executed by the processor causes the decoder to perform operations. The decoder performs operations including copying a first segment of a previously received part of a received audio signal from a prototype buffer. The decoder performs further operations including overlap adding a second segment of the previously received part of the received audio signal from the prototype buffer to an initial portion of a reconstructed part of the received audio signal followed by a remaining portion of the reconstructed part of the received audio signal.

According to yet other embodiments of inventive concepts, a decoder for filling an analysis window length with a time domain signal for concealing a lost audio frame associated with a received audio signal is provided, wherein the decoder is adapted to perform operations comprising: copying a first segment of a previously received part of a received audio signal from a prototype buffer and overlap adding a second segment of the previously received part of the received audio signal from the prototype buffer to an initial portion of a reconstructed part of the received audio signal followed by a remaining portion of the reconstructed part of the received audio signal.

According to additional embodiments, a computer program comprising program code to be executed by at least one processor of a decoder for filling an analysis window length with a time domain signal for concealing a lost audio frame associated with a received audio signal is provided. Execution of the program code causes the decoder to perform operations including copying a first segment of a previously received part of a received audio signal from a prototype buffer and overlap adding a second segment of the previously received part of the received audio signal from the prototype buffer to an initial portion of a reconstructed part of the received audio signal followed by a remaining portion of the reconstructed part of the received audio signal.

According to yet other embodiments, a computer program product comprising a non-transitory storage medium including program code to be executed by at least one processor (1306) of a decoder (1300) for filling an analysis window length with a time domain signal for concealing a lost audio frame associated with a received audio signal. Execution of the program code causes the decoder to perform operations including copying a first segment of a previously received part of a received audio signal from a prototype buffer and overlap adding a second segment of the previously received part of the received audio signal from the prototype buffer to an initial portion of a reconstructed part of the received audio signal followed by a remaining portion of the reconstructed part of the received audio signal.

According to some embodiments, filling the active part of an MDCT window with a signal that is already available in the PLC prototype buffer and OLA between the endpoint of the IFFT and PLC prototype buffer may reduce the effect of a possibly unreliable end point of the IFFT signal.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 8 illustrates a Phase ECU buffer completion copy length table in accordance with some embodiments of inventive concepts;

FIG. 9 illustrates a Phase ECU buffer completion OLA length table in accordance with some embodiments of inventive concepts;

FIGS. 10-12 are flowcharts illustrating decoder operations according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive.

Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

With a PLC using sinusoidal modeling in the frequency domain, the recreated signal may be less reliable at the endpoints of the IFFT signal. Part of this may be masked by the windows shape of the MDCT analysis window, especially when it is symmetric regarding leading and trailing zeros. Leading zeros are positioned on future samples and therefore lowers the algorithmic delay of the coder and therefore may be frequently used. Trailing zeros may be mainly used to make the windows simpler but this may lower the transform efficiency as they contribute to the complexity without adding any information on the input signal. It therefore may be common to use fewer trailing zeros.

Low delay asymmetric MDCT windows may have sharper (quickly increasing/quickly decreasing) window shapes than larger delay symmetric MDCT windows with a similar frequency resolution. The sharper windows shapes in combination with the lower reliability of the IFFT signal may include more of these unreliable parts into the MDCT analysis windowing, and the subsequent TDA and ITDA steps, used to create the final reconstructed signal including an updated MDCT memory (a.k.a. MDCT OLA memory buffer). This may result in lower quality of the reconstructed signal. While one approach may be to increase the length of the prototype, this may not be desirable as this may significantly increase the complexity of the PLC. Another approach may be to use a shorter MDCT window within the actual audio codec, but that may lead to worse frequency resolution (and worse performance) for the audio codec.

Figures 1, 2:
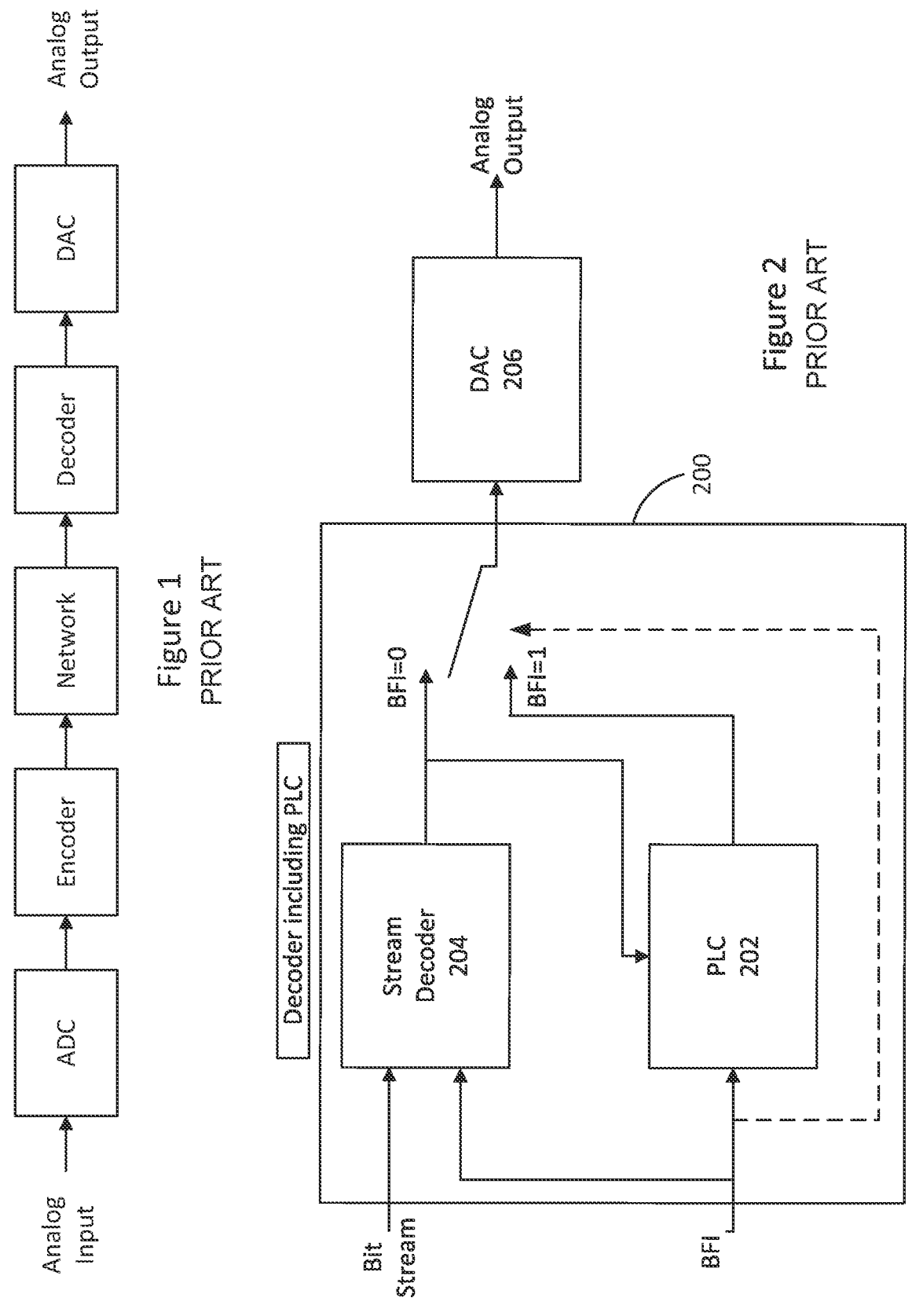
FIG. 1 illustrates a block diagram of using an audio encoder and an audio decoder over a network.
FIG. 2 illustrates is a block diagram of a decoder including packet loss concealment.
Figure 3:
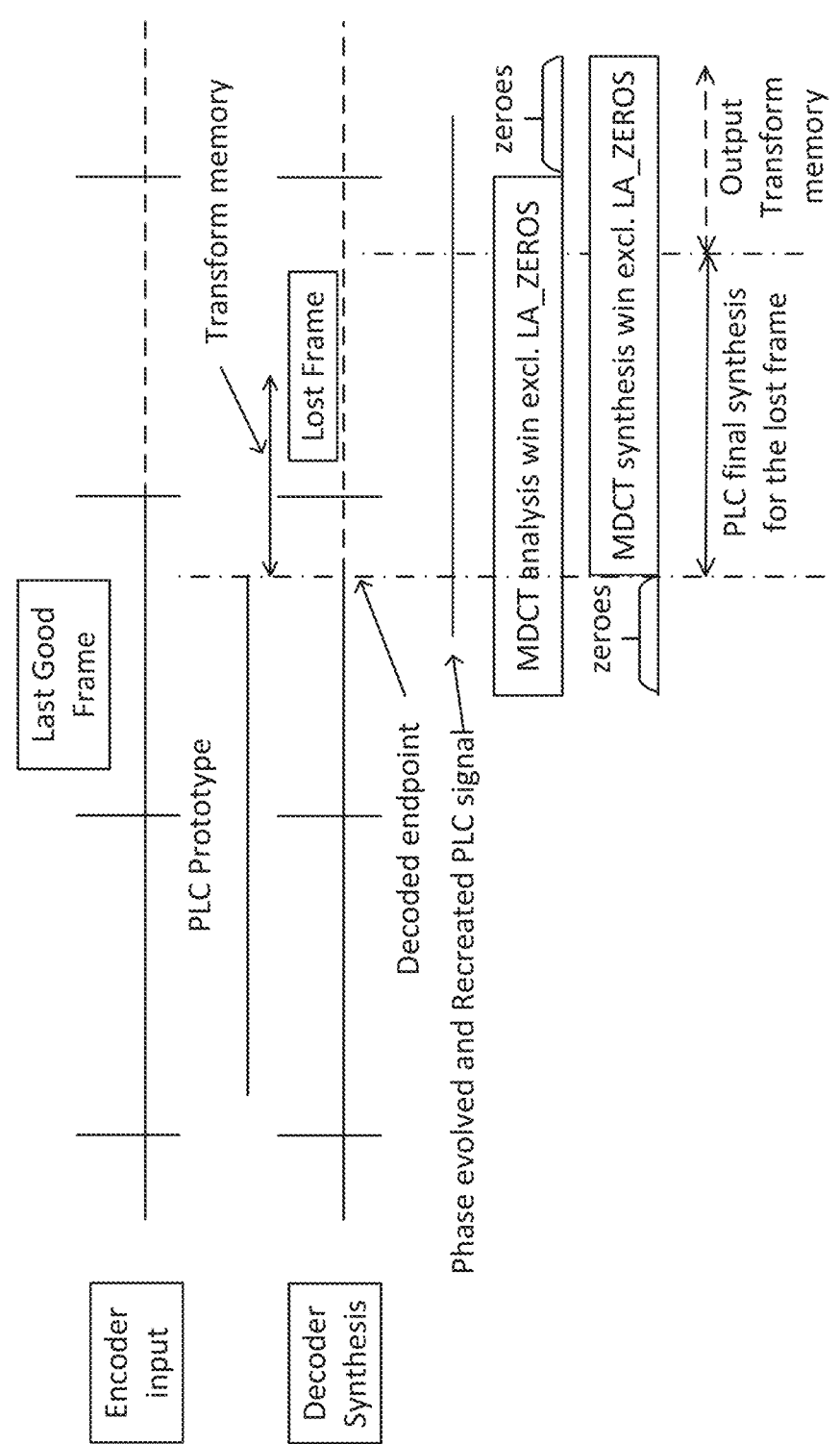
FIG. 3 illustrates a time alignment and signal diagram of Phase ECU and recreation of the signal from a PLC prototype.

The combination of a rather short Inverse Fast Fourier Transform (IFFT) (e.g. of a length corresponding to 16 ms, providing roughly 12 ms of reliable evolved samples in the time domain) and a low-delay MDCT analysis and synthesis steps using "Windowing→TDA→ITDA" input that is considerably larger (e.g. 18 ms) than the provided 12 ms of time domain samples is a challenging problem to solve. Using a larger IFFT increases complexity (e.g., of the PLC) and using a smaller LD-MDCT window decreases the codec's spectral resolution, which in turn will deteriorate the compression efficiency, which is illustrated in FIG. 3. FIG. 3 illustrates a time alignment and signal diagram of Phase ECU and recreation of the signal from a PLC prototype using phase evolution of the prototype and the new temporal location (the phase). The final reconstruction is made using MDCT analysis-windowing, TDA and ITDA steps and MDCT synthesis windowing where the last synthesis windowing step also uses the past stored MDCT transform memory (MDCT-OLA buffer) and creates a new (MDCT-OLA signal buffer) for use during the next frame (GOOD or BAD). An asymmetric MDCT window with look ahead zeroes, (LA_ZEROS—⅜ of the frame length) is used in FIG. 3. similar operations of using look ahead zeros are discussed in 3GPP TS 26.447 V15.0.0 clause 5.4.3.5, 3GPP TS 26.445 V15.1.0 clause 5.3.2.2, and 3GPP TS 26.445 V15.1.0 clause 6.2.4.1.

Some embodiments of the present disclosure of inventive concepts may fill the active part of a MDCT window with a signal that is already available in the PLC prototype buffer and may reduce the effect of possibly unreliable end point part of the IFFT signal using OLA between the endpoint of the IFFT and PLC prototype buffer.

Some embodiments of the present disclosure of inventive concepts may use a prototype time domain signal. With a PLC using sinusoidal modelling the decoder keeps a prototype time domain signal in the form of a last decoded signal in a PLC prototype buffer. That is, the substitution frame for the lost frame is calculated by applying the sinusoidal model on a frame of the previously synthesized good frame signal, where this frame serves as a prototype frame. A good frame means a correctly received frame, while a bad frame means an erased, i.e. a lost or corrupted, frame.

Figure 4:
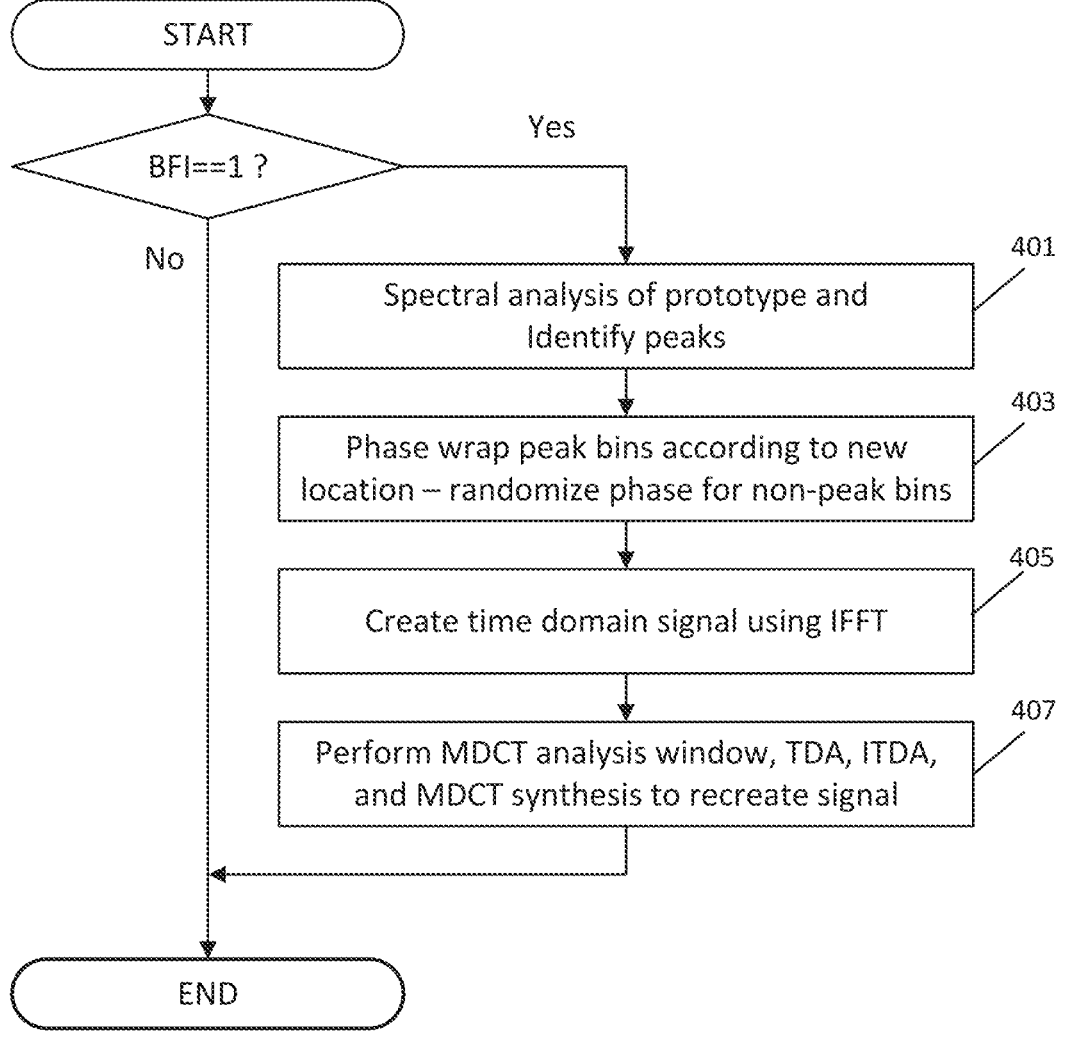
FIG. 4 is a flowchart of operations for PLC signal reconstruction.

Turning to FIG. 4, missing or corrupted packets may be identified by a transport layer handling the connection and is signaled to the decoder as a "bad frame" through a Bad Frame Indicator (BFI). When a bad frame indicator (BFI) indicates a lost or corrupted frame has occurred, a PLC using sinusoidal modelling in block 401 uses the last synthesized good frame signal (i.e., the prototype frame) to perform spectral analysis of the prototype frame signal and identifies the peaks of the magnitude signal. Then, fractional frequencies of the peaks are estimated using peak frequency bins. In block 403, the peak frequency bins corresponding to the peaks along with the neighbor of the peak frequency bins are phase shifted. For the remaining frequency bins of the frame, the magnitude of the past synthesis is retained while the phase may be randomized. In block 405, a time domain signal is created using IFFT. Then follows MDCT windowing, TDA and ITDA, as shown in block 407.

Some embodiments of the present disclosure of inventive concepts may use a PLC prototype buffer to create a high-quality approximation signal to fill the complete MDCT analysis window length. This may involve two operations; one operation may perform a copy of one segment of the PLC prototype buffer into an MDCT processing buffer. The other operation may overlap add the remaining last part of the prototype buffer with the initial time evolved IFFT signal into the MDCT processing buffer, as illustrated in FIG. 4. Then follows MDCT windowing, TDA and ITDA, as shown in block 407 of FIG. 4.

In operations discussed in 3GPP TS 26.447 V15.1.0 clause 6.2.4.1, the time domain prototype signal from the preceding frame is only used during the first frame loss. For consecutive sinusoidal modeling, the spectral representation of the prototype is saved and used in consecutive lost frames. However, to be able to perform the copy and OLA operations of some embodiments of the present disclosure, during consecutive frame errors the relevant part of the prototype buffer (or a separate time continuity buffer) may need to be continuously updated (that is, during BAD frames). With the spectral representation saved it is not needed to update the complete prototype buffer during processing of consecutive lost frames.

In some embodiments, quality may be improved in a case where the method for packet concealment is sinusoidal modeling in the frequency domain. By ensuring that the recreated frame is well integrated with the currently decoded signal even when the frame reconstruction step following the IFFT of the Phase ECU only provides a limited frame (i.e. a limited amount of properly time evolved samples) and when the MDCT window is non-symmetric regarding leading and trailing zeros.

In various embodiments of inventive concepts disclosed herein, the unreliable endpoint of the IFFT signal may be partly replaced and non-symmetric MDCT windows may be used for the Windowing, TDA and ITDA steps. This may reduce the frame repetitive discontinuities that will be introduced otherwise. The inventive concepts disclosed herein improve the quality of PLC of tonal signals and may essentially eliminate a synthesis noise floor that otherwise may be created due to not providing the MDCT analysis windowing step with enough reliable samples.

In various embodiments of inventive concepts disclosed herein, rather short IFFT (e.g. 16 ms resulting in roughly 12 ms of reliable time evolved samples) may be used in combination with efficient low-delay MDCT even though the MDCT analysis/synthesis window requires more than 12 ms of reliable signal to provide high quality analysis and synthesis reconstruction, and interface (via the MDCT OLA memory buffer) to the core audio codec.

In some embodiments of inventive concepts, the MDCT may be taken over a 20 ms window with a 10 ms advance. The PLC prototype frame saved after good frames may be 16 ms in length. The related transient detector may use two short FFT with length 4 ms—that is one quarter of the PLC prototype frame. The actual length of these items depends on the sampling frequency used and can be from 8 kHz to 48 kHz. These lengths affect the number of spectral bins in each transform.

In some embodiments disclosed herein, creation of an evolved and temporally corrected signal $x_{ph}(n)$ may be made according to a core Phase ECU method, see e.g., a core Phase ECU method discussed in 3GPP TS 26.477 V15.0.0 clause 5.4.3.5.

In some embodiments disclosed herein, the signal $x_{ph}(n)$ then may be extended in both directions into $x_{ph\_ext}(n)$ to achieve the same length as the normal MDCT window to create smooth transition from the last decoded frame to the new reconstructed signal before the windowing. The left (oldest) part may need two steps, one segment copy and one segment overlap and add. In the first step, one part from the prototype buffer (time domain samples) may be copied, corresponding to the synthesized part before evolved and reconstructed signal. In the second step, an overlap add segment may be made between the final part from the prototype buffer and the initial part of the reconstructed signal in $x_{ph}(k)$. The part after the reconstructed signal may be zero extended. This signal $x_{ph\_ext}(n)$ may then be windowed (MDCT analysis window) and time domain aliased as done in an MDCT based encoder. The leading zero samples in the asymmetric MDCT window are referred to as LA_ZEROS. The resulting windowed and the time-domain aliased signal may then be overlap and add (OLA) processed with the MDCT's memory/state from the previous frame as described in a traditional MDCT decoder.

Some embodiments of inventive concepts are presented on a non-limiting example of the window used for the OLA of the PLC prototype and the trailing reconstructed PLC signal being a Hann window, whereas embodiments of the present disclosure may also apply to other types of windows, e.g., a Hamming window, a Kaiser window, etc.

In some embodiments, the OLA may first apply a sample by sample window to achieve the fading out of the part from the PLC prototype buffer. The windows scale each sample in the buffer according to the function:

$$w_{old}(n) = 0.50 + 0.50\cos\left(\frac{\pi n}{L_{ola}}\right), 0 \le n < L_{ola} \qquad (1)$$

where $L_{ola}$ is length of the OLA segment. A second window may be used to achieve the fading in of the initial (oldest) part of the recreated IFFT time domain signal, with the scaling of each sample defined as:

$$w_{new}(n) = 0.50 - 0.50\cos\left(\frac{\pi n}{L_{ola}}\right), 0 \le n < L_{ola} \qquad (2)$$

The windowed scaled samples from the PLC prototype and the IFFT tail may be summed and form the new estimate for the OLA time segment. The two windows ($w_{old}$ and $w_{new}$) are preferably constructed so that the sum at any point n is 1.0.

FIG. 8 illustrates a Phase ECU buffer completion copy length table in accordance with some embodiments of inventive concepts. FIG. 8 illustrates that lengths of the copy part (Lcopy) depend on the sampling frequency. FIG. 9 illustrates the length of the hamming part which depends on the sampling frequency $f_s$ in accordance with some embodiments of inventive concepts.

Some embodiments of the present disclosure may provide a smooth and a near noiseless synthesis signal for steady state sinusoids.

In some embodiments of the present disclosure, the length of COPY segment and the OLA segment may be dynamically adapted based on analysis of the past synthesized signal and the somewhat unreliable phase evolved IFFT signal.

For example, the COPY part may be extended to 2.75 ms and the OLA part reduced to 1 ms in the case that the default lengths (2.0 ms, 1.75 ms) result in a strong transient in the 0.75 ms region corresponding to the oldest samples from the unreliable IFFT signal. A transient detector may compare the RMS (root mean square) value of the first 2 ms to the RMS of the 0.75 ms adaptation region with both sets of lengths (COPY, OLA), and may use the set of lengths that provides the lowest difference in RMS-energy.

In some embodiments of the present disclosure, complexity may be reduced by preprocessing the COPY segment with the MDCT analysis window in the GOOD non-PLC frames. The same may be performed for the COPY segment and for the OLA segment using a combined OLA_old window and MDCT window. This redistribution of windowing complexity may allow for more complexity to be used in the BAD frames.

Figure 5:
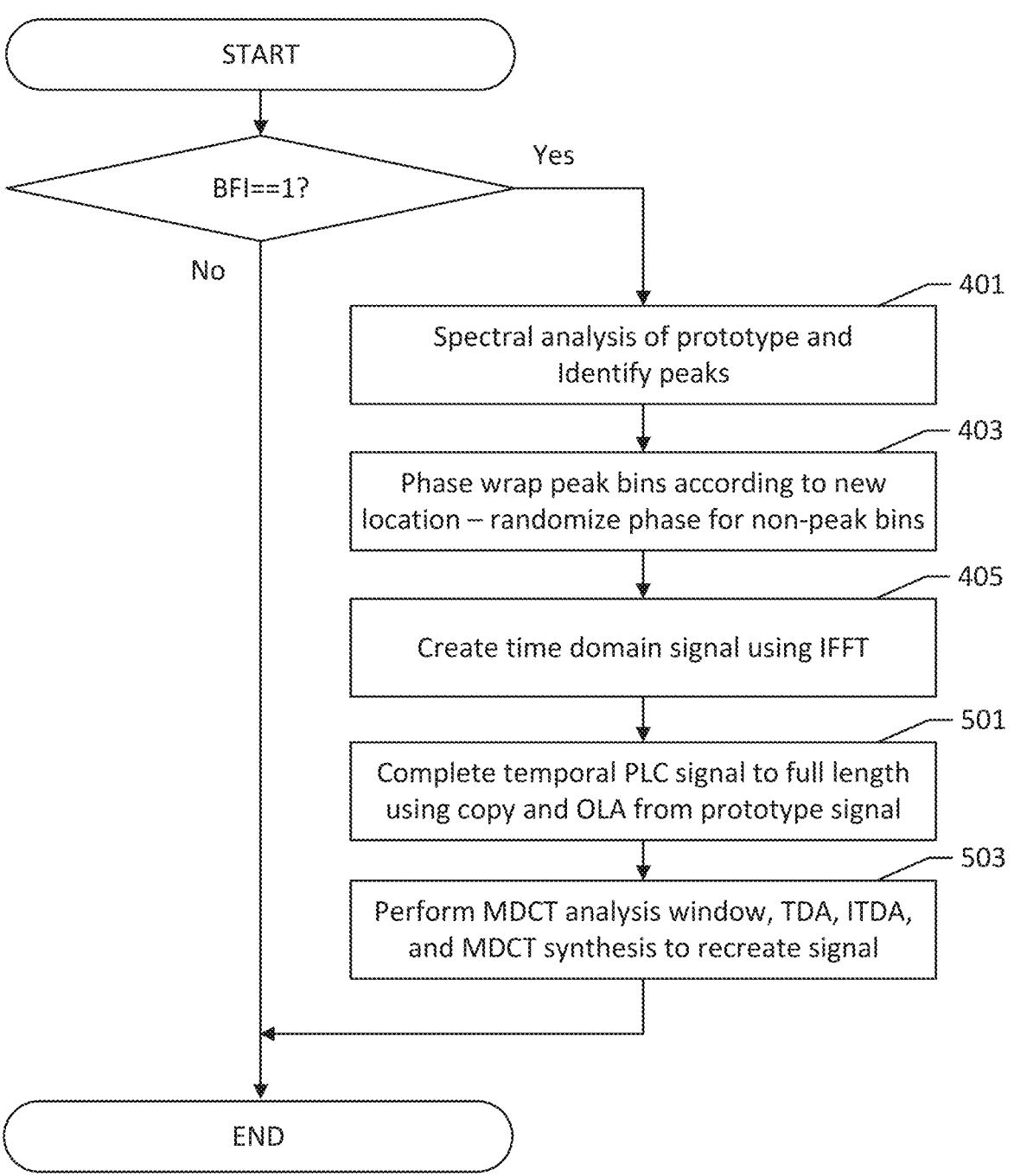
FIG. 5 is a flowchart for generating a temporal PLC signal in accordance with some embodiments of inventive concepts.
Figure 6:
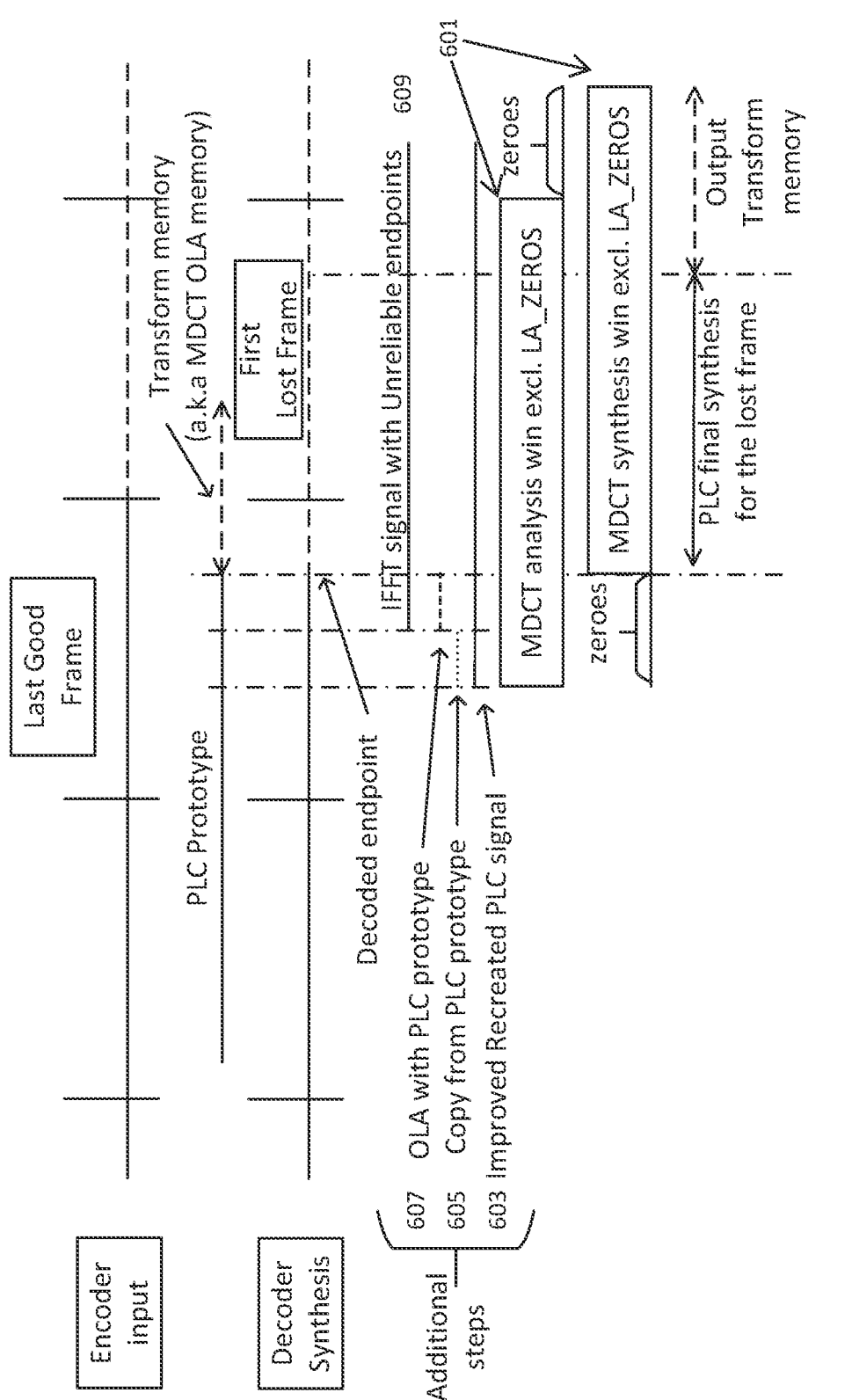
FIG. 6 is a signal diagram of PLC processing using a PLC Prototype in accordance with some embodiments of inventive concepts.

FIG. 5 is a flowchart for generating a temporal PLC signal in accordance with some embodiments of inventive concepts. Blocks 401, 403, and 405 are described above in the description of FIG. 4. At block 501, a complete temporal PLC signal may be generated to the full MDCT length using copy and OLA from a prototype signal. At block 503, operations may be performed that include perming MDCT analysis window, TDA, ITDA, and MDCT synthesis and MDCT-OLA to recreate the PLC signal 603, as shown in FIG. 6. Generation of the temporal signal of FIG. 5 also may reduce use of IFFT end points that may be unreliable.

FIG. 6 is a signal diagram of PLC processing in accordance with some embodiments of inventive concepts. Window 601 shows use of a PLC Prototype 605 to fill the MDCT frame and to make an overlap add (OLA) 607 between the PLC prototype 605 and the possibly unreliable initial end points of the IFFT reconstructed signal 609. The other endpoint of 609 overlaps with the look ahead zeros of the analysis MDCT window 601.

Figure 7:
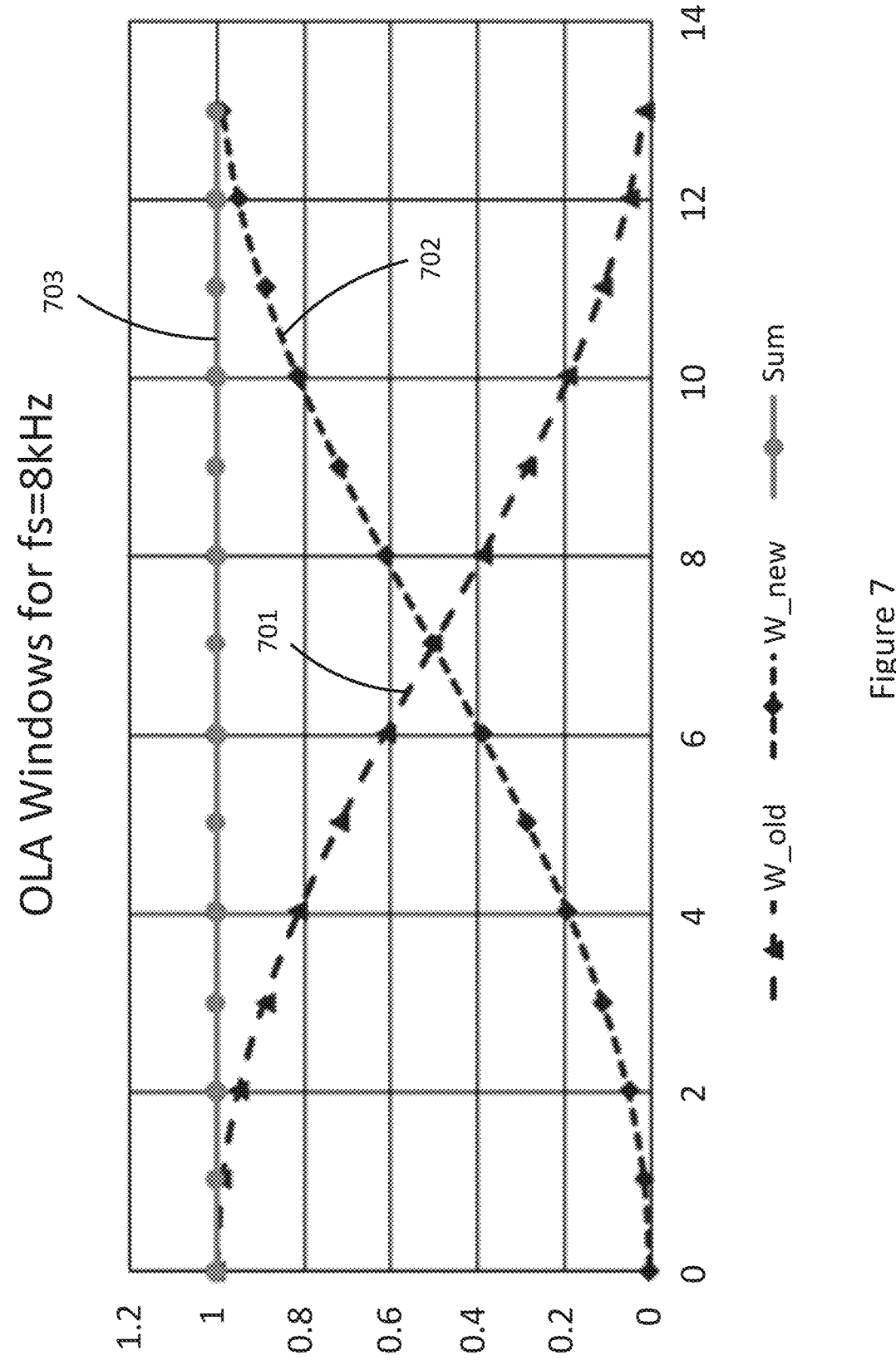
FIG. 7 illustrates two windows for OLA summing in accordance with some embodiments of inventive concepts.

FIG. 7 illustrates how two windows 701 (old) and 702 (new) may be used for the OLA contribute to sum the two windowed signals parts 703.

Operations of decoder 1300 (see FIGS. 14-15) will now be discussed with reference to the flow charts of FIGS. 10-12 according to some embodiments of inventive concepts. For example, modules may be stored in memory 1308 of FIGS. 14-15, and these modules may provide instructions so that when the instructions of a module are executed by processor 1306, processor 1306 performs respective operations of the respective flow chart.

FIG. 10 illustrates operations of a decoder for filling an analysis window length with a time domain signal for concealing a lost audio frame associated with a received audio signal. At block 1000 of FIG. 10, processor 1306 of decoder 1300 copies a first segment of previously received part of received audio signal from a prototype buffer 1318 to processing buffer 1320. At block 1002, processor 1306 of decoder 1300 overlap adds a second segment of previously received part of received audio signal from prototype buffer 1318 to initial portion of reconstructed part of received audio signal into processing buffer 1320 followed by remaining portion of reconstructed part of received audio signal.

FIG. 11 illustrates further operations of a decoder for filling an analysis window length with a time domain signal for concealing a lost audio frame associated with a received audio signal when there may be consecutive lost frames.

At block 1100 of FIG. 11, processor 1306 of decoder 1300 copies a first segment of a previously received part of received audio signal from time continuity buffer 1316. At block 1102, processor 1306 of decoder 1300 overlap adds a second segment of previously received part of received audio signal from time continuity buffer 1316 to an initial portion of reconstructed part of received audio signal into processing buffer 1320 followed by remaining portion of reconstructed part of received audio signal.

Prototype buffer 1318 may be updated with newly decoded signal and time continuity buffer 1316 may be updated with a newly recreated signal after MDCT OLA.

FIG. 12 illustrates further operations of a decoder for filling an analysis window length with dynamically adapted signal segment lengths. At block 1200 of FIG. 12, processor 1306 of decoder 1300 may dynamically adapt the length of the first and second segments based on analysis of a previously synthesized time domain signal from a filled analysis window length.

Various operations from flowcharts 11 and 12 may be optional with respect to some embodiments of a decoder and related methods. For example, blocks 1100, 1102, and 1200 may be optional.

Figure 13:
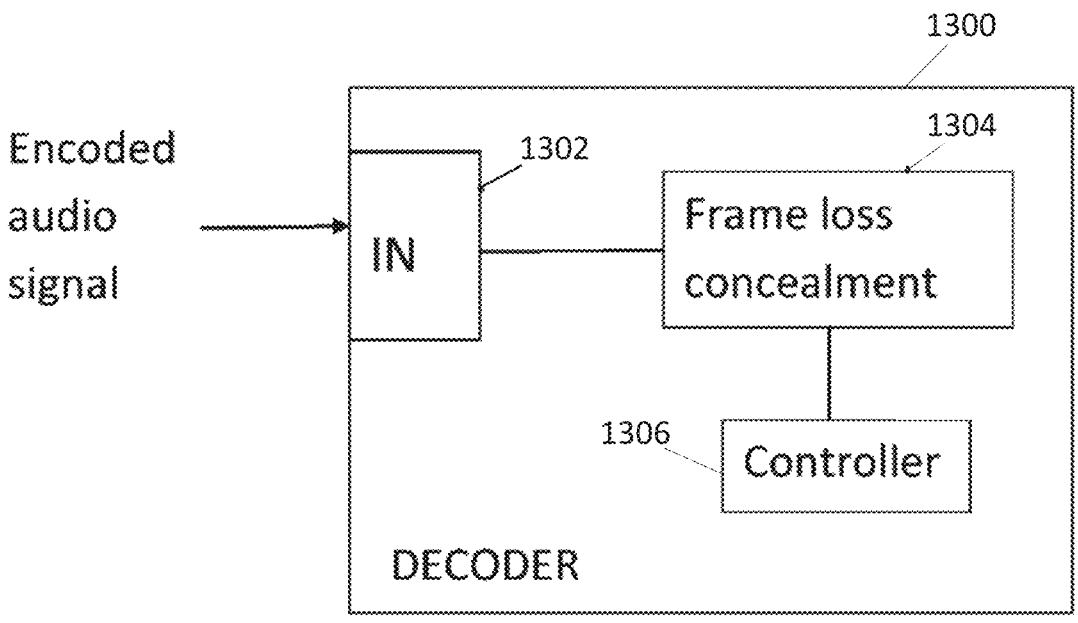
FIGS. 13-15 are block diagrams of a decoder according to some embodiments of inventive concepts.
Figure 14:
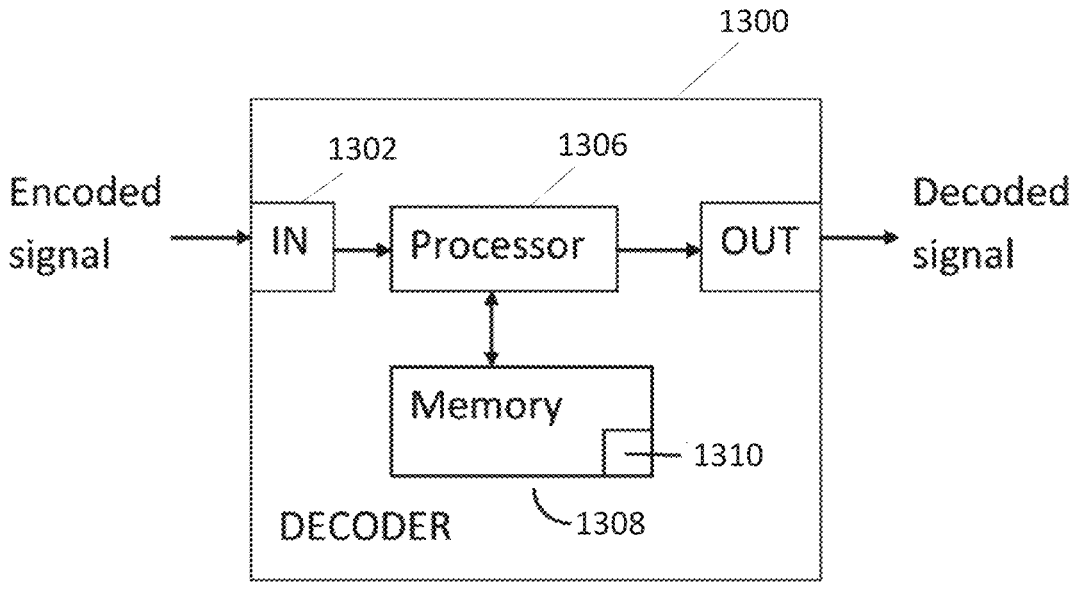
Figure 15:
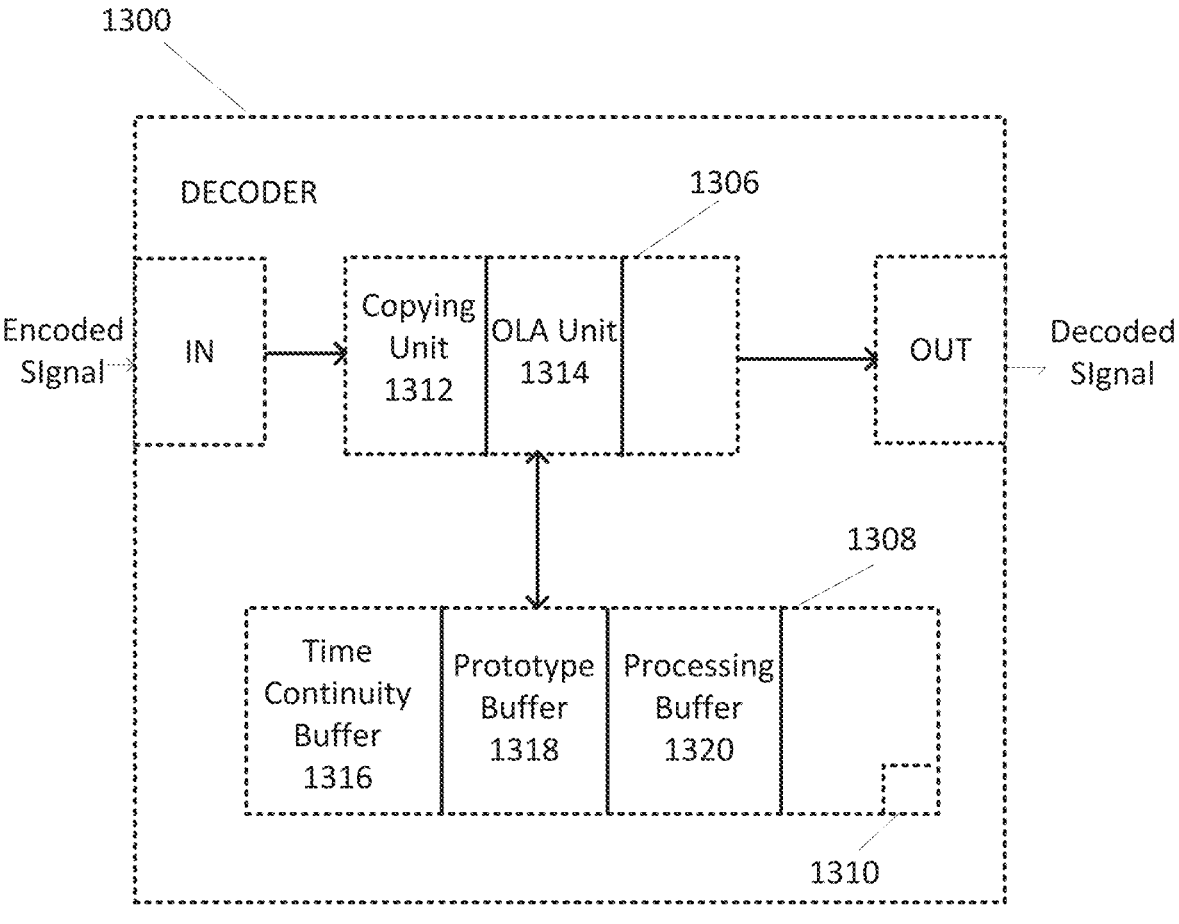

Various embodiments described above apply to a controller in a decoder, as illustrated in FIGS. 13-15. FIG. 13 is a schematic block diagram of a decoder according to some embodiments. The decoder 1300 comprises an input unit 1302 configured to receive an encoded audio signal. FIG. 13 illustrates frame loss concealment by a logical frame loss concealment-unit 1304, which indicates that the decoder is configured to implement a concealment of a lost audio frame, according to various embodiments described herein. Further, decoder 1300 comprises a controller 1306 (also referred to herein as a processor or processor circuit) for implementing various embodiments described herein. Controller 1306 is coupled to the input (IN) and a memory 1308 (also referred to herein as a memory circuit) coupled to the processor 1306. The decoded and reconstructed audio signal obtained from processor 1306 is outputted from the output (OUT). The memory 1308 may include computer readable program code 1310 that when executed by the processor 1306 causes the processor to perform operations according to embodiments disclosed herein. According to other embodiments, processor 1306 may be defined to include memory so that a separate memory is not required.

Controller 1306 is configured to fill an analysis window length with a time domain signal for concealing a lost audio frame associated with a received audio signal. Controller 1306 may copy a first segment of a previously received part of a received audio signal from a prototype buffer to a processing buffer. Controller 1306 may overlap add (OLA) a second segment of the previously received part of the received audio signal from the prototype buffer to an initial portion of a reconstructed part of the received audio signal into the processing buffer followed by a remaining portion of the reconstructed part of the received audio signal. Copying may be performed by a copying unit 1312 and OLA may be performed by an OLA unit 1314 as illustrated in FIG. 15. Signals to be processed by processor 1306, including copying unit 1312 and OLA unit 1314, may be provided from memory 1308, including from time continuity buffer 1316, prototype buffer 1318 and processing buffer 1320 as illustrated in FIG. 15.

The decoder with its copying and OLA units may be implemented in hardware. There are numerous variants of circuitry elements that can be used and combined to achieve the functions of the units of the decoder. Such variants are encompassed by the various embodiments. Particular examples of hardware implementation of the decoder are implementation in digital signal processor (DSP) hardware and integrated circuit technology, including both general-purpose electronic circuitry and application-specific circuitry.

Abbreviations

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
| --- | --- |
| ADC | Analog to Digital Converter |
| BFI | Bad Frame Indicator |
| DAC | Digital to Analog Converter |
| FFT | Fast Fourier Transform |
| IFFT | Inverse Fast Fourier Transform |
| ITDA | Inverse Time Domain Aliasing |
| LA_ZEROS | Look Ahead Zeros |
| MDCT | Modified Discrete Cosine Transform |
| OLA | OverLap and Add |
| TDA | Time Domain Aliasing |

REFERENCES

[1] 3GPP TS 26.447 V15.0.0 clause 5.4.3.5
[2] 3GPP TS 26.445 V15.1.0 clause 5.3.2.2
[3] 3GPP TS 26.445 V15.1.0 clause 6.2.4.1
The references 3GPP TS 26.447 V15.0.0 clause 5.4.3.5, 3GPP TS 26.445 V15.1.0 clause 5.3.2.2, and 3GPP TS 26.445 V15.1.0 clause 6.2.4.1 are hereby incorporated by reference as if their contents were set forth herein in full.
Listing of Example Embodiments of Inventive Concepts:
Example Embodiments are discussed below. Reference numbers/letters are provided in parenthesis by way of example/illustration without limiting example embodiments to particular elements indicated by reference numbers/letters.

1. A method of filling an analysis window length with a time domain signal for concealing a lost audio frame of a received audio signal, the method comprising:

copying (1000, 1312) a first segment of a previously received part of a received audio signal from a prototype buffer (1318) to a processing buffer (1320); and overlap adding (1002, 1314) a second segment of the previously received part of the received audio signal from the prototype buffer (1318) to an initial portion of a reconstructed part of the received audio signal into the processing buffer (1320) followed by a remaining portion of the reconstructed part of the received audio signal.

2. The method of Embodiment 1, wherein the previously received part of the received audio signal is a time domain signal.

3. The method of any of Embodiments 1 to 2, wherein the reconstructed part of the received audio signal comprises a time evolved transform signal.

4. The method of any of Embodiments 1 to 3, wherein the processing buffer is a lapped transform modified discrete cosine transform (MDCT) buffer.

5. The method of any of Embodiments 1 to 4, wherein the MDCT analysis window is asymmetric.

6. The method of any of Embodiments 1 to 5, further comprising copying and overlap adding for consecutively lost frames, comprising:

copying (1100, 1312) a first segment of a previously received part of a received audio signal from a time continuity buffer (1316); and overlap adding (1102, 1314) a second segment of the previously received part of the received audio signal from the time continuity buffer (1316) to an initial portion of a reconstructed part of the received audio signal into the processing buffer (1320) followed by a remaining portion of the reconstructed part of the received audio signal.

7. The method of any of Embodiments 1 to 6, wherein the time continuity buffer is updated with a newly recreated signal after the MDCT overlap adding.

8. The method of any of Embodiments 1 to 7, wherein the overlap added portion of the analysis window comprises:

applying a first window (701, 1314) to obtain a first scaled sample of the previously received part of the received audio signal from the prototype buffer;

applying a second window (702, 1314) to obtain a second scaled sample of the reconstructed part of the received audio signal;

summing (703, 1314) the first and second scaled samples to form the overlap added portion of the analysis window.

9. The method of any of Embodiments 1 to 8, wherein the length of the first segment depends on the sampling frequency.

10. The method of any of Embodiments 1 to 9, wherein the length of the overlap added portion of the analysis window depends on the sampling frequency.

11. The method of any of Embodiments 1 to 10, further comprising:

dynamically adapting (1200, 1306) the length of the first and second segments based on an analysis of a previously synthesized time domain signal from a filled analysis window length.

12. A decoder (1300) for filling an analysis window length with a time domain signal for concealing a lost audio frame of a received audio signal, the decoder comprising:

a processor (1306); and memory (1308) coupled with the processor, wherein the memory includes instructions that when executed by the processor causes the decoder to perform operations according to any of Embodiments 1-11.

13. A decoder (1300) for filling an analysis window length with a time domain signal for concealing a lost audio frame of a received audio signal, wherein the decoder is adapted to perform according to any of Embodiments 1-11.

14. A computer program comprising program code to be executed by at least one processor (1306) of a decoder (1300) for filling an analysis window length with a time domain signal for concealing a lost audio frame of a received audio signal, whereby execution of the program code causes the decoder (1300) to perform operations according to any one of embodiments 1-11.

15. A computer program product comprising a non-transitory storage medium including program code to be executed by at least one processor (1306) of a decoder (1300) for filling an analysis window length with a time domain signal for concealing a lost audio frame of a received audio signal, whereby execution of the program code causes the decoder (1300) to perform operations according to any one of embodiments 1-11.

ADDITIONAL EXPLANATION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of filling an analysis window length for concealing a lost audio frame associated with a received audio signal, the method comprising:

copying a first segment of the received audio signal from a prototype buffer, wherein the first segment comprises a first portion of a time domain signal of a most recently synthesized audio frame, wherein the most recently synthesized audio frame includes a last decoded good frame prior to a lost audio frame associated with the received audio signal;

overlap adding a second segment of the received audio signal from the prototype buffer with an initial portion of a reconstructed audio signal, wherein the second segment comprises a second portion, directly following the first portion, of the time domain signal of the most recently synthesized audio frame, wherein the reconstructed audio signal includes a recreation of the lost audio frame generated using an inverse fast Fourier transform (IFFT); and generating a temporal signal to fill an analysis window length of a lapped transform modified discrete cosine transform (MDCT) analysis window, the temporal signal comprising (i) the copied first segment of the received audio signal followed by (ii) the overlap added second segment of the received audio signal with the initial portion followed by (iii) a remaining portion of the reconstructed audio signal.

2. The method of claim 1, wherein copying the first segment from the prototype buffer comprises copying the first segment into a processing buffer, and wherein overlap adding the second segment from the prototype buffer with the initial portion of the reconstructed audio signal comprises overlap adding the second segment from the prototype buffer with the initial portion of the reconstructed audio signal into the processing buffer.

3. The method of claim 2, wherein the processing buffer is a lapped transform MDCT buffer.

4. The method of claim 1, wherein the reconstructed audio signal comprises a time evolved transform signal.

5. The method of claim 1, wherein the MDCT analysis window is asymmetric.

6. The method of claim 1, further comprising copying and overlap adding for consecutively lost frames, comprising:

copying a first segment of a recreated audio signal from a time continuity buffer into a processing buffer;

overlap adding a second segment of the recreated audio signal from the time continuity buffer with an initial portion of another reconstructed audio signal into the processing buffer; and generating another temporal signal to fill another analysis window length comprising (i) the copied first segment of the recreated audio signal followed by (ii) the overlap added second segment of the recreated audio signal with the initial portion of the another reconstructed audio signal followed by (iii) a remaining portion of the another reconstructed audio signal.

7. The method of claim 6, wherein the time continuity buffer is updated with a newly recreated signal after the overlap adding.

8. The method of claim 1, wherein overlap adding the second segment of the received audio signal from the prototype buffer with the initial portion of the reconstructed audio signal comprises:

applying a first window to obtain a first scaled sample of the previously received first segment of the received audio signal from the prototype buffer;

applying a second window to obtain a second scaled sample of the reconstructed audio signal; and summing the first and second scaled samples.

9. The method of claim 1, wherein a length of the copied first segment depends on a sampling frequency.

10. The method of claim 1, wherein a length of the overlap added second segment with the initial portion depends on a sampling frequency.

11. The method of claim 1, further comprising:

dynamically adapting lengths of the first and second segments based on an analysis of a previously synthesized time domain signal from a filled analysis window length.

12. A decoding device for filling an analysis window length for concealing a lost audio frame associated with a received audio signal, the decoding device comprising:

a processor; and memory coupled with the processor, wherein the memory includes instructions that when executed by the processor causes the decoding device to perform operations comprising:

copying a first segment of the received audio signal from a prototype buffer, wherein the first segment comprises a first portion of a time domain signal of a most recently synthesized audio frame, wherein the most recently synthesized audio frame includes a last decoded good frame prior to a lost audio frame associated with the received audio signal;

overlap adding a second segment of the received audio signal from the prototype buffer with an initial portion of a reconstructed audio signal, wherein the second segment comprises a second portion, directly following the first portion, of the time domain signal of the most recently synthesized audio frame, wherein the reconstructed audio signal includes a recreation of the lost audio frame generated using an inverse fast Fourier transform (IFFT); and generating a temporal signal to fill an analysis window length of a lapped transform modified discrete cosine transform (MDCT) analysis window, the temporal signal comprising (i) the copied first segment of the received audio signal followed by (ii) the overlap added second segment of the received audio signal with the initial portion followed by (iii) a remaining portion of the reconstructed audio signal.

13. The decoding device of claim 12, wherein copying the first segment from the prototype buffer comprises copying the first segment into a processing buffer, and wherein overlap adding the second segment from the prototype buffer with the initial portion of the reconstructed audio signal comprises overlap adding the second segment from the prototype buffer with the initial portion of the reconstructed audio signal into the processing buffer.

14. The decoding device of claim 13, wherein the processing buffer is a lapped transform MDCT buffer.

15. The decoding device of claim 12, wherein the reconstructed audio signal comprises a time evolved transform signal.

16. The decoding device of claim 12, wherein the MDCT analysis window is asymmetric.

17. The decoding device of claim 12, wherein the operations further comprise copying and overlap adding for consecutively lost frames, comprising:

copying a first segment of a recreated audio signal from a time continuity buffer into the processing buffer;

overlap adding a second segment of the recreated audio signal from the time continuity buffer with an initial portion of another reconstructed audio signal into a processing buffer; and generating another temporal signal to fill another analysis window length comprising (i) the copied first segment of the recreated audio signal followed by (ii) the overlap added second segment of the recreated audio signal with the initial portion of the another reconstructed audio signal followed by (iii) a remaining portion of the another reconstructed audio signal.

18. The decoding device of claim 17, wherein the operations further comprise updating the time continuity buffer with a newly recreated signal after the overlap add.

19. The decoding device of claim 12, wherein overlap adding the second segment of the received audio signal from the prototype buffer with the initial portion of the reconstructed audio signal comprises:

applying a first window to obtain a first scaled sample of the received audio signal from the prototype buffer;

applying a second window to obtain a second scaled sample of the reconstructed audio signal; and summing the first and second scaled samples.

20. The decoding device of claim 12, wherein a length of the first segment depends on a sampling frequency.

21. The decoding device of claim 12, wherein a length of the overlap added second segment with the initial portion depends on a sampling frequency.

22. The decoding device of claim 12, wherein the operations further comprise:

dynamically adapting lengths of the first and second segments based on an analysis of a previously synthesized time domain signal from a filled analysis window length.

23. A computer program product comprising a non-transitory storage medium including program code to be executed by at least one processor of a decoding device for filling an analysis window length for concealing a lost audio frame associated with a received audio signal, whereby execution of the program code causes the decoding device to perform operations comprising:

copying a first segment of the received audio signal from a prototype buffer, wherein the first segment comprises a first portion of a time domain signal of a most recently synthesized audio frame, wherein the most recently synthesized audio frame includes a last decoded good frame prior to a lost audio frame associated with the received audio signal;

overlap adding a second segment of the received audio signal from the prototype buffer to an initial portion of a reconstructed audio signal, wherein the second segment comprises a second portion, directly following the first portion, of the time domain signal of the most recently synthesized audio frame, wherein the reconstructed audio signal includes a recreation of the lost audio frame generated using an inverse fast Fourier transform (IFFT); and generating a temporal signal to fill an analysis window length of a lapped transform modified discrete cosine transform (MDCT) analysis window, the temporal signal comprising (i) the copied first segment of the received audio signal followed by (ii) the overlap added second segment of the received audio signal with the initial portion followed by (iii) a remaining portion of the reconstructed audio signal.

24. The computer program product of claim 23, wherein the operations further comprise:

copying and overlap adding for consecutively lost frames, comprising:

copying a first segment of a recreated audio signal from a time continuity buffer into a processing buffer;

overlap adding a second segment of the recreated audio signal from the time continuity buffer with an initial portion of another reconstructed audio signal into a processing buffer; and generating another temporal signal to fill another analysis window length comprising (i) the copied first segment of the recreated audio signal followed by (ii) the overlap added second segment of the recreated audio signal with the initial portion of the another reconstructed audio signal followed by (iii) a remaining portion of the another reconstructed audio signal.

* * * * *